Oct. 17, 1950   C. H. SMOOT   2,525,967
RESET MOTOR CONTROL SYSTEM
Filed Sept. 16, 1949

INVENTOR:
Charles H. Smoot,
BY Dawson, Orms, Booth and Spangenberg,
ATTORNEYS.

Patented Oct. 17, 1950

2,525,967

UNITED STATES PATENT OFFICE 2,525,967

RESET MOTOR CONTROL SYSTEM

Charles H. Smoot, Chicago, Ill., assignor to Republic Flow Meters Company, Chicago, Ill., a corporation of Illinois Application September 16, 1949, Serial No. 116,059

10 Claims. (Cl. 318—28)

This invention relates to electric control systems and more particularly to electrically operated systems for controlling physical conditions, processes, operations, power plants and the like.

Heretofore the control of physical conditions, processes and the like in industrial operations has largely been effected by fluid pressure operated controllers. These devices require that fluid pressure be available at a large number of points, and in a large installation may involve extremely long pipe connections which introduce lags into the system. It is accordingly one of the objects of the present invention to provide an electric control system in which all of the control impulses or forces are electrical. Thus the need for fluid pressure sources or long pipe connections is eliminated, and an extremely rapid system is provided.

Another object is to provide a control system in which the throttling range can be adjusted electrically. According to one feature of the invention this adjustment is accomplished by the use of a simple rheostat or potentiometer in the control circuit.

Still another object is to provide a control system in which a reset type of control is provided. For this purpose the error or signal voltage controls one reversible motor for adjusting a control device and for controlling the production of a voltage indicative of the position or condition of the control device and also controls a second reversible motor controlling the production of a second voltage opposing the first voltage. Thus the error voltage must always be reduced to zero for the system to return to balance.

A further object is to provide a control system in which generators are operated by the reversible motors and supply voltages to the motor control circuits to prevent overshooting and hunting. Preferably, alternating current motor controls and generator are employed.

The above and other objects and advantages of the invention will be more readily apparent when read in connection with the accompanying drawing, in which—

Figure 1:
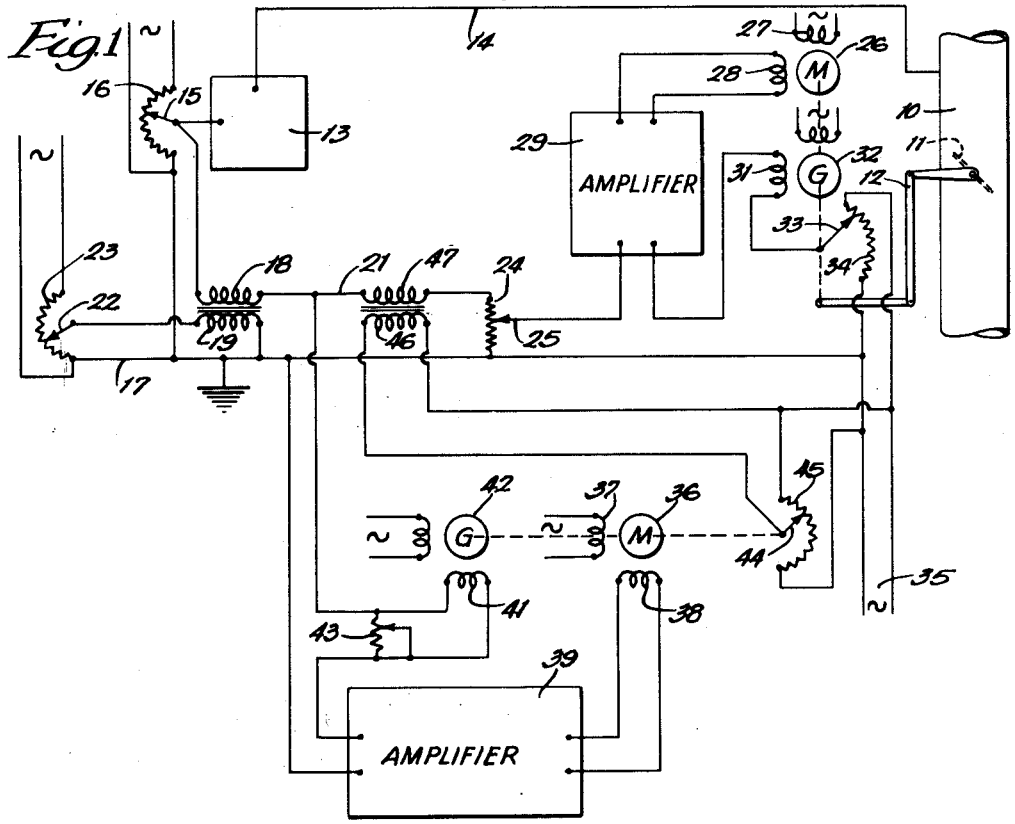
Figure 1 is a circuit diagram of a control system embodying the invention.

As illustrated in Figure 1, the system is adapted to control the pressure in a pipe or conduit 10 the flow through which is regulated by a butterfly valve 11 controlled through a lever 12. Assuming that fluid is flowing upward through the conduit 10, the pressure above the valve will be increased by opening the valve and will be decreased by closing the valve. It will be understood that this construction has been illustrated as a sample illustration of a condition to be controlled and that any other condition such as flow, temperature or other industrial processes can equally well be controlled in substantially the same manner.

The pressure in the conduit 10 is conducted to a measuring instrument 13 through a conduit 14 to move a wiper 15 over a potentiometer resistance 16. The instrument 13 may be any desired type of instrument to measure the condition to be controlled and to produce a movement of the wiper 15 in response to changes in the condition. The resistor 16 is supplied from a source of alternating signal voltage which may, for example, be 40 volts 60 cycles. One end of the resistor 16 is connected to a circuit line 17, and the opposite end is connected through a transformer winding 18 magnetically coupled to a winding 19 to a circuit line 21.

The set point of the system is adjusted by means of a wiper 22 movable over a resistance 23 which is supplied from a source similar to that supplying the resistor 16 and which may be the same source. One end of the resistor 23 is connected to the line 17, and the wiper 22 is connected through the winding 19 to the line 17. The windings 18 and 19 are so wound that the voltages therein will be out of phase with each other so that when the two voltages are equal there will be zero potential between the lines 17 and 21. If the set point voltage should be changed either by manual adjustment or through a master controller to exceed the voltage from the wiper 15, an alternating voltage of one phase will be produced across the lines 17 and 21 and of a magnitude depending upon the unbalance of the voltages. If the set point voltage should become less than that at the wiper 15, a voltage of opposite phase will appear between the lines 17 and 21.

The line 21 is connected to the line 17 across a resistor 24 forming a part of a throttling range adjusting potentiometer. An adjustable wiper 25 engages the resistor 24 and can be adjusted so that any desired portion of the signal voltage will appear between the wiper 25 and the line 17. As will be more apparent hereinafter, adjustment of the wiper 25 will change the throttling range of the system in a very simple but effective manner.

The voltage between wiper 25 and line 17 is utilized to control a reversible motor 26 of the two phase type having a main power winding 27 and a control winding 28. The control winding is supplied with current from an amplifier 29 having one of its input terminals connected to the wiper 25. The other input terminal of the amplifier is connected through a winding 31 on a generator 32 to a wiper 33 movable over a resistance 34, one side of which is connected to the line 17 and to a source of alternating voltage 35 of the same phase and amplitude as the source supplying resistors 16 and 23. The other side of the source 35 is connected to the opposite end of the resistor 34. The phase of the voltages is such that the voltage developed at the wiper 33 is the same as the signal voltage produced at the wiper 25. The generator 32, the wiper 33 and the valve linkage 12 are all connected to the motor 26 to be driven thereby.

With the system as so far described, a positioning type of control with throttling range adjustment is provided. For example, when a signal voltage is developed at the wiper 25 due to unbalance of the sources 15 and 22, the amplifier will supply operating current to the motor 26. The motor in turn will move the wiper 33 until the voltage produced at the wiper balances the signal voltage and at the same time will adjust the valve 11 to a new position dependent upon the signal supplied.

During this operation while the motor 26 is running the generator 32 will introduce in the winding 31 a voltage of opposite phase to the signal voltage so that the circuit tends to reach an apparent condition of balance before the wiper 33 has been fully adjusted. This prevents overshooting of the motor and eliminates hunting in the system.

In order to provide a reset control so that the value of the condition will always be returned exactly to the set point, a reset circuit mechanism is provided. As shown, this comprises a reversible motor 36 having a main winding 37 and a control winding 38 supplied from an amplifier 39. The input terminals are connected across the lines 17 and 21 with the input winding 41 of a generator 42 in series with one of the connections. Preferably, an adjustable rheostat 43 is connected across the generator winding 41 to adjust the amount of anti-hunt voltage which is introduced in the amplifier input circuit.

The motor 36 drives the generator 42 and in addition moves a wiper 44 over a resistor 45 which is connected across the source 35. The wiper 44 and one side of the resistor 45 are connected to the ends of a transformer winding 46 which is coupled to a winding 47 in the line 21. With this construction the voltage developed across the winding 47 is algebraically added to the signal voltage.

In operation of this part of the circuit, whenever a signal appears across the lines 17 and 21 the motor 36 will be operated to adjust the wiper 44. This motor operates at a slower rate than the motor 26 and is preferably set to operate at approximately the same rate at which the condition is corrected by adjustment of the valve 11. Thus, when a signal initially appears the motor 26 will function to adjust the valve and to produce in the potentiometer 34 a voltage sufficient to balance the signal voltage. As the condition returns toward the desired value, the instrument 13 will readjust the wiper 15 toward its normal position to reduce the signal voltage toward zero. At the same time the motor 36 will adjust the wiper 44 to change the voltage introduced into the circuit by the winding 47 in a sense to rebalance the changed voltage developed at the potentiometer 34. If the system is properly adjusted, when the signal voltage disappears, indicating that the condition has been brought back to the desired value, the voltages at the potentiometers 34 and 45 will exactly balance each other and the entire system will then be in balance. The system may be explained algebraically by reference to the equation:

$$E_e = E_p - E_r$$

Where $E_e$ is the error or signal voltage, $E_p$ is the position voltage developed across the potentiometer 34 and indicative of the position of the control device 11, and $E_r$ is the reset voltage developed across the potentiometer 45. With the system in balance, $E_e$ is zero so that $E_p$ and $E_r$ are equal. However, when the system is operating with a signal or error voltage present, the above equation holds true. Since the rate of speed of the motor 36 is dependent upon the amplitude of the control voltage supplied to its amplifier 39 its rate of change may be expressed by the equation:

$$dE_r/dt = E_r K$$

Where K is a constant representing the adjustment of the motor 36. When this factor is equal to the rate of response to the condition to adjustment of the valve or control device 11, the system is properly set and will provide an accurate and rapid control.

Figure 2:
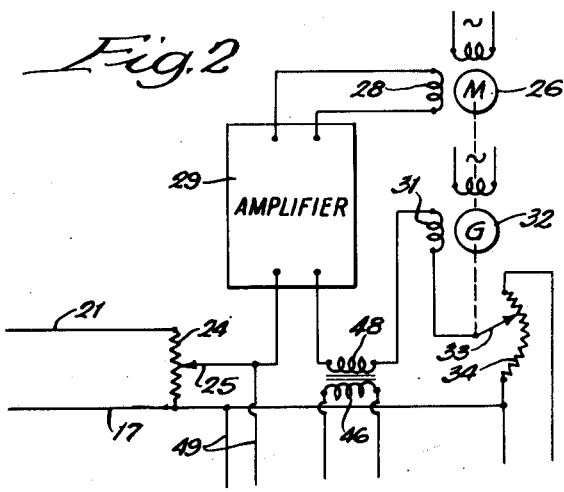
Figure 2 is a partial diagram similar to Figure 1 showing a modification.

Figure 2 illustrates a slight modification of the system in which the rate of reset adjustment is dependent upon the throttling range adjustment, parts corresponding to identical parts in Figure 1 being indicated by the same reference numerals. In this construction the winding 47 in the line 21 is omitted, and a similar winding 48 is placed in series with one of the input terminals of the amplifier 29 and is coupled to the winding 46 from the reset potentiometer 45. In this construction the control circuit for the motor 36, as indicated by the lines 49, is connected between the wiper 25 and the line 17 so that the speed of the reset motor will be dependent upon the setting of the throttling range potentiometer 25. Also the reset potentiometer 45 will produce a voltage equal to that in the positioning potentiometer rather than equal to a multiple thereof as in the circuit of Figure 1. Otherwise, the two circuits function in identically the same manner and either one may be employed, as desired.

While two embodiments of the invention have been shown and described in detail herein, it will be understood that they are illustrative only and are not to be taken as a definition of the scope of the invention, reference being had for this purpose to the appended claims.

What is claimed is:

1. An electric control system comprising a signal circuit, means responsive to a condition to be controlled to produce a signal voltage in the circuit, a reversible motor adapted to operate a control device affecting the condition, a variable voltage device connected to the motor to be controlled thereby and connected to the signal circuit, means responsive to the voltage in the signal circuit to control the motor, a second variable voltage device connected to the signal circuit in voltage opposition to the first variable voltage device, and means responsive to the voltage in the signal circuit to control the second variable voltage device.

2. An electric control system comprising a signal circuit, means responsive to a condition to be controlled to produce a signal voltage in the circuit, a reversible motor adapted to operate a control device affecting the condition, a variable voltage device connected to the motor to be controlled thereby and connected to the signal circuit, means responsive to the voltage in the signal circuit to control the motor, a second variable voltage device connected to the signal circuit in voltage opposition to the first variable voltage device, a second reversible motor connected to the second variable voltage device to control it, and means responsive to the voltage in the circuit to control the second reversible motor.

3. An electric control system comprising a signal circuit, means responsive to a condition to be controlled to produce a signal voltage in the circuit, a reversible motor adapted to operate a control device affecting the condition, a variable voltage device connected to the motor to be controlled thereby and connected to the signal circuit, means responsive to the voltage in the signal circuit to control the motor, a second variable voltage device connected to the signal circuit in voltage opposition to the first variable voltage device, a second reversible motor connected to the second variable voltage device to control it, means responsive to the voltage in the circuit to control the second reversible motor, and a generator driven by each of the motors and connected to the control means for the respective motor in voltage opposition to the voltage in the circuit.

4. An electric control system comprising a signal circuit, means responsive to a condition to be controlled to produce a signal voltage in the circuit, a reversible motor adapted to operate a control device affecting the condition, a variable voltage device connected to the motor to be controlled thereby, a resistance connected across the signal circuit, a control circuit for the motor connected to a wiper engaging the resistance and including the variable voltage device, a second reversible motor, means responsive to the voltage in the signal circuit to control the second motor, a second variable voltage device connected to the second motor to be adjusted thereby, and connections from the second variable voltage device to one of the circuits connecting the variable voltage devices in voltage opposition.

5. The construction of claim 4 in which the motors drive generators which are connected respectively into the control circuits for the motors.

6. The construction of claim 4 in which the second variable voltage device is connected to the signal circuit.

7. The construction of claim 4 in which the second variable voltage device is connected to the control circuit for the first named motor.

8. An electric control system comprising a pair of sources of alternating voltage connected in phase opposition, one of which is variable in response to a condition to be controlled and the other which determines the set point of the system, a reversible motor adapted to be connected to a control device affecting the system, a control circuit for the motor connected to said sources to control the direction and extent of operation of the motor in accordance with the phase and amplitude of the resulting voltage from the sources, a variable alternating voltage device connected to the motor to be controlled thereby and connected in the control circuit, a second reversible motor, a control circuit for the second motor connected to the first named control circuit to control the direction and extent of movement of the second motor in accordance with the phase and amplitude of the voltage in the control circuit, a second variable alternating voltage device connected to the second motor to be controlled thereby, and a circuit connecting the second variable voltage device to the first named control circuit in phase opposition to the first named variable voltage device.

9. The construction of claim 8 in which there are alternating current generators driven by the motors and connected to the respective motor control circuits in phase opposition to the control voltages in the circuits.

10. An electric control system comprising a pair of sources of alternating voltage connected in phase opposition, one of which is variable in response to a condition to be controlled and the other of which determines the set point of the system, a reversible motor adapted to be connected to a control device affecting the system, a resistor connected across the sources, a control circuit for the motor adjustably connected to the resistor to control the direction and extent of operation of the motor in accordance with the phase and amplitude of the voltage appearing across the resistor, a variable alternating voltage device connected to the motor to be controlled thereby and connected in the control circuit, a second reversible motor, a second control circuit for the second motor connected across the resistor, and a second variable alternating voltage device connected to the second motor to be controlled thereby and connected in the circuit at one side of the resistor in phase opposition to the first named voltage device.

CHARLES H. SMOOT.

No references cited.

Disclaimer 2,525,967.—*Charles H. Smoot*, Chicago, Ill. RESET MOTOR CONTROL SYSTEM. Patent dated Oct. 17, 1950. Disclaimer filed Mar. 7, 1952, by the inventor; the assignee, *Republic Flow Meters Company*, consenting.
Hereby enters this disclaimer to claims 1, 2, 3, 8, and 9 of said patent.
[*Official Gazette April 8, 1952.*]